(12) United States Patent
Bartimus

(10) Patent No.: US 6,898,861 B2
(45) Date of Patent: May 31, 2005

(54) STRING LINE TOOL AND SHEATHS THEREFOR

(76) Inventor: Christopher Shawn Bartimus, 1020 N. 2nd St., Payette, ID (US) 83661

(*) Notice: Subject to any disclaimer, the term of this patent is extended or adjusted under 35 U.S.C. 154(b) by 0 days.

(21) Appl. No.: 10/685,999

(22) Filed: Oct. 14, 2003

(65) Prior Publication Data

US 2004/0128845 A1 Jul. 8, 2004

Related U.S. Application Data

(63) Continuation-in-part of application No. 10/062,891, filed on Jan. 30, 2002, now abandoned, which is a continuation-in-part of application No. 09/847,614, filed on May 2, 2001, now Pat. No. 6,622,393.

(51) Int. Cl.$^7$ .............................. G01C 15/10; B43L 7/00
(52) U.S. Cl. .............................. 33/392; 33/413; 33/332
(58) Field of Search .......................... 33/413, 414, 392, 33/393, 394, 409, 332, 666, 353, 391, 1 G

(56) References Cited

U.S. PATENT DOCUMENTS

| | | | |
|---|---|---|---|
| 266,671 A | 10/1882 | Bergen | 33/393 |
| 267,655 A | 11/1882 | Vajen | 33/392 |
| 316,530 A | 4/1885 | Downie et al. | 33/332 |
| 426,434 A | 4/1890 | Campbell | 33/414 |
| 485,376 A | 11/1892 | Fuller | 33/392 |
| 630,262 A | 8/1899 | Nacke | 33/392 |
| 642,888 A | 2/1900 | Van Vliet | 33/393 |
| 668,998 A | 2/1901 | Napier | 33/392 |
| 909,846 A | 1/1909 | Cavlieer | 33/353 |
| 1,025,828 A | 5/1912 | Paul | 33/392 |
| 1,060,855 A | 5/1913 | Pipher | 33/393 |
| 1,098,033 A | 5/1914 | Friendship | 33/413 |
| 1,110,897 A | 9/1914 | Comstock | 33/392 |
| 1,147,304 A | 7/1915 | Byron | 33/393 |
| 1,178,835 A | 4/1916 | Berg | 33/392 |
| 1,271,470 A | 7/1918 | Ibaraki | 33/414 |
| 1,336,289 A | 4/1920 | Fagrie | 33/393 |
| 1,586,654 A | 6/1926 | Conway | 33/393 |
| 1,596,882 A | 8/1926 | Langsner | 33/392 |
| 1,609,777 A | 12/1926 | Senez | 33/393 |

(Continued)

FOREIGN PATENT DOCUMENTS

| | | | | |
|---|---|---|---|---|
| JP | 57086012 A | 5/1982 | | 33/392 |
| JP | 04025713 A | 1/1992 | | 33/392 |

OTHER PUBLICATIONS

Sketch of Asian tool believed by Applicant to have a long history of use in Asia.

Primary Examiner—Christopher W. Fulton
Assistant Examiner—Mirellys Jagan
(74) Attorney, Agent, or Firm—Pedersen & Co., PLLC; Ken J. Pedersen; Barbara S. Pedersen

(57) ABSTRACT

A pointed tool and sheath combination allow for use of the tool as a string line anchor and/or as a plumb bob and provide safe storage of the tool when not in use. The preferred tool is comprised of a dart-like body having a longitudinal axial bore, and a sharpened spike clamped within the longitudinal bore. Sheaths are provided that with snap-in installation of the tool down past curved, inwardly-protruding walls of the sheath, or of the tool into engagement with a latching arm that cooperates with a recess or other latching surface on the tool.

17 Claims, 8 Drawing Sheets

U.S. PATENT DOCUMENTS

| | | | |
|---|---|---|---|
| 1,653,191 A | 12/1927 | Savage | 33/414 |
| 1,949,652 A | 3/1934 | McLaws | 33/392 |
| 2,135,211 A | 11/1938 | Johnson | 33/393 |
| 2,446,253 A | 8/1948 | Tresidder | 33/409 |
| 2,482,360 A | 9/1949 | Moore | 33/666 |
| 2,492,609 A | 12/1949 | Worden | 33/393 |
| 2,492,884 A | 12/1949 | Patermaster | 33/392 |
| 2,499,722 A | 3/1950 | Chesbro | 33/393 |
| 2,578,062 A | 12/1951 | Greene | 33/392 |
| 2,594,823 A | 4/1952 | Suverkrop | 33/392 |
| 2,637,913 A | 5/1953 | Williams | 33/393 |
| 2,779,045 A | 1/1957 | Harvey | 33/393 |
| 2,784,498 A | 3/1957 | Fleming | 33/393 |
| 2,803,067 A | 8/1957 | Kurschner | 33/392 |
| 3,011,263 A | 12/1961 | Unger | 33/393 |
| 3,016,616 A | 1/1962 | Matson | 33/332 |
| 3,113,387 A | 12/1963 | Bean, Jr. | 33/392 |
| 3,442,025 A | 5/1969 | Mathiesen | 33/332 |
| 3,448,525 A | 6/1969 | Majewski | 33/392 |
| 3,683,510 A | 8/1972 | Gros | 33/392 |
| 3,720,001 A | 3/1973 | Majewski | 33/392 |
| 4,335,522 A | 6/1982 | Canfield | 33/353 |
| 4,459,761 A | 7/1984 | Bosco | 33/414 |
| 4,461,091 A | 7/1984 | Gammon | 33/392 |
| 4,926,562 A | 5/1990 | Hwu | 33/414 |
| 5,157,843 A | 10/1992 | Barcewski | 33/392 |
| 5,426,860 A | 6/1995 | Lee et al. | 33/392 |
| 5,465,494 A | 11/1995 | Johnston | 33/414 |
| 5,621,977 A | 4/1997 | Hampton | 33/392 |
| 5,720,113 A | 2/1998 | Bartimus | 33/314 |
| 6,167,632 B1 | 1/2001 | Shor | 33/414 |
| 6,622,393 B2 | 9/2003 | Bartimus | 33/392 |

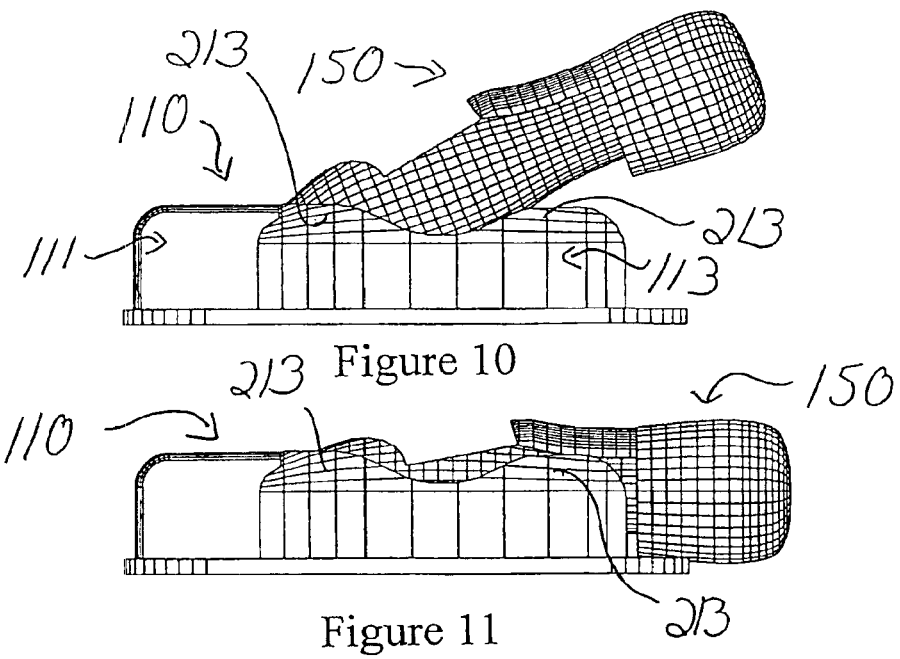
Figure 10
Figure 11
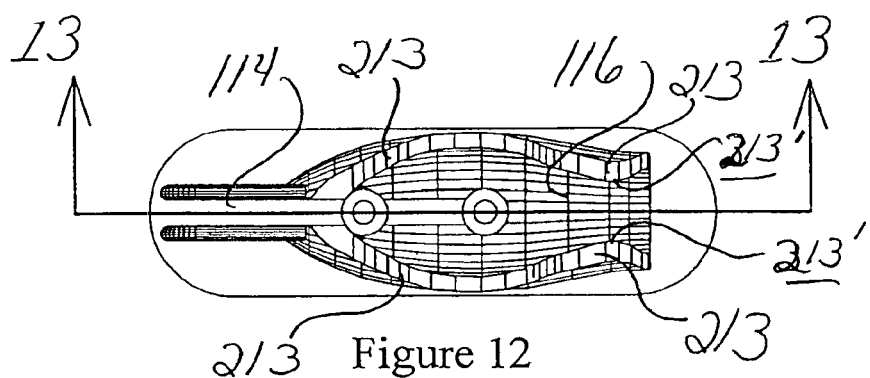
Figure 12
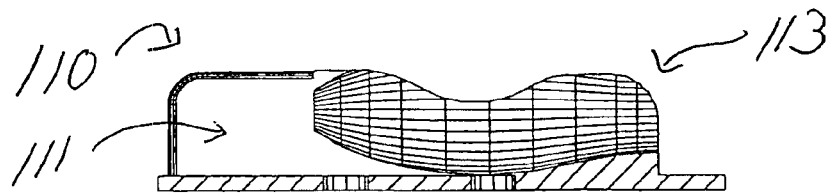
Figure 13
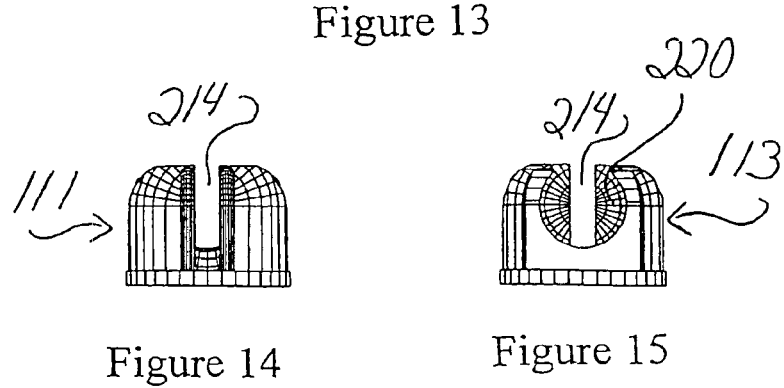
Figure 14
Figure 15

STRING LINE TOOL AND SHEATHS THEREFOR

This application is a continuation-in-part of, and claims priority from, U.S. patent application Ser. No. 10/062,891, filed Jan. 30, 2002 now abandoned, entitled "Sheath for Combined String Line Anchor and Plumb Bob Tool," which is a continuation-in-part of, and claims priority from, U.S. patent application Ser. No. 09/847,614, filed on May 2, 2001, entitled "A Combined String Line Anchor and Plumb Bob," and issued Sep. 23, 2003 as U.S. Pat. No. 6,622,393, the disclosures of which are incorporated herein by this reference.

BACKGROUND OF THE INVENTION

1. Field of the Invention

This invention relates generally to construction and carpentry equipment and tools, and more particularly to anchoring devices for string/chalk lines and plumb bobs and to protective and safety sheaths for such tools.

2. Related Art

In building construction and carpentry projects, alignment strings and chalk lines are frequently used to confirm or establish straight lines. Such strings (or lines) have one portion that serves to store the unused portion of the string, e.g. a simple ball of string or, as is often the case, a reel of some sort is used to pay-out and pay-in the line. The other "free" end of the line is usually held by an assistant or anchored by a mechanical device. Such mechanical devices typically include a nail, an awl, a stickpin, and so forth. Frequently commercial chalk lines include an L-shaped hook with an eyelet tied to the line's free end. The hook is used to anchor the line over the edge of a work piece. After the chalk line is properly positioned, the line is plucked near its center to cause a chalk mark to be left on the surface of the underlying material.

All of the above mentioned anchoring devices see considerable use at construction job sites. The stickpin is one of the more commonly used string line anchoring devices. These pins are about the size of an adult finger and have the general shape of the body of a dart (without feathers). The forward end of the stickpin, as in a dart, includes a highly sharpened, needle like point. In use, the string is tied around an annular groove in the stickpin, the pin is pressed by hand into the work surface and the line is then looped around the needle portion immediately adjacent to the surface. The other end of the line is then pulled to tighten the string against the stickpin. The needle portion of the stickpin is typically formed from a high strength steel so that it may be pushed by hand, without damaging the point, into a variety of non-metallic materials, such as wood, plywood, sheetrock, etc.

A significant disadvantage of known stickpins is that the length of the needle cannot be adjusted to allow the body of the stickpin to serve as a fixed stop for the insertion of the needle into materials of differing hardness. This capability is desirable so that the pin is not inserted further than is needed to satisfactorily anchor the string. If it is inserted too far it will leave an excessively large hole when it is removed. Also, the risk of breaking the needlepoint is also increased when it is inserted too far. Should the sharpened point be broken, in some cases it may be resharpened, if not, the tool must be discarded.

Plumb bobs are also frequently used by carpenters and other construction industry professionals. As is well known, a plumb bob is used to determine the "plumbness" or verticality of a wall, stud column, etc. It also is used to vertically transfer a point at one elevation to another elevation.

In laying out construction projects, plumb bobs are frequently used in concert with string lines and chalk lines. The availability of a tool that integrates all the features of a string/chalk line stickpin anchoring device and a plumb bob would increase the efficiency of the carpenter and reduce overall expenses to the project. In addition, a tool that would allow replacement of a broken point in the stickpin would further increase the efficiency of the carpenter and decrease his/her equipment costs.

U.S. Pat. No. 5,720,113 teaches an integrated string line anchoring device and plumb bob which is especially designed to accommodate the use of an L-shaped eyelet hook on the end of the string line. This prior tool has a dart-shaped body terminating in a sharpened point to serve as a stickpin anchor. The body has a recess for holding the L-shaped eyelet hook at the end of a string. The tool further incorporates a threaded cap that releasably retains the hook within the recess in the body. This tool is not configured for field replacement of the sharpened point. To serve as a plumb bob, the threaded cap is removed to reveal a groove in the body in which the string is placed to allow the tool to be suspended from it central axis, thus serving as a plumb bob. Alternatively, a slot may be provided in the cap to allow the string to be routed to the central axis suspension point.

There is still a need for a string line tool that may be easily mounted on a string line box and easily handled and used either as a string line anchor or a plumb bob. There is still a need for a string line tool with a durable and reliable spike for insertion into wood and other building materials, wherein the spike is adjustable and/or replaceable. Embodiments of the present invention meet these needs. There is also a need for a sheath for such tools that protects the spike from damage and protects users from the spike, and that keeps the tool in an easily-reachable and convenient location.

SUMMARY OF THE INVENTION

The invention comprises a tool having a sharpened spike or other point for insertion in building materials and having adaptation for attachment of a string line for use in building trades. When combined with a string line, the tool may be used both as a chalk line anchor and a plumb bob. The tool may include adaptation for adjusting the length of the sharpened spike or replacing the spike. The tool may include adaptation for guiding or retaining the string line to be at or near the center longitudinal axis of the tool end. The tool may include adaptation for holding a string line hook. Invented sheaths may be provided to cover the tool's point, to protect the tool from damage, to manage the string line, and to ensure that the tool is easily reachable.

These and many other features and attendant advantages of the invention will become apparent as the invention becomes better understood by reference to the following detailed descriptions and accompanying drawings.

BRIEF DESCRIPTION OF THE DRAWINGS

FIG. 7b is an isometric view of the clamping system of FIG. 7a.

FIG. 10 is a side view of the sheath of FIGS. 8 and 9, with the tool of FIG. 8 being inserted into the sheath.

FIG. 11 is a side view of the sheath of FIGS. 8–10, with the tool fully inserted into the sheath.

FIG. 12 is a top view of the sheath of FIGS. 8–11.

FIG. 13 is cross-sectional view of the sheath of FIGS. 8–12, viewed along the line 13—13 in FIG. 12.

FIG. 14 is a front end view of the sheath of FIGS. 8–13.

FIG. 15 is a rear end view of the sheath of FIGS. 8–14.

DESCRIPTION OF THE PREFERRED EMBODIMENTS

Referring to the Figures, there are shown several, but not the only embodiments of the invented tool and storage system. In FIGS. 1–7B, there is shown a tool according to one embodiment of the invention that includes an adjustable clamp system for lengthening or shortening the tool spike. The tool may be comprised of a dart-like body having a longitudinal axial bore receiving a spike clamped within the longitudinal bore. The amount of the spike extending from the body may be adjusted to accommodate the variety of material hardness encountered at the work site, for example, short lengths for harder materials such as cement board and longer lengths for soft materials. In addition, the clamping system allows the spike to be completely removed and replaced with a new spike, as needed due to damage or breakage. Thus, it is yet further object of this embodiment to provide a tool in which the length of the exposed sharpened point of the tool may be varied to provide an adjustable penetration depth capability to the anchor. It is yet another object of this and other embodiments to provide a tool that is inexpensively manufactured and is formed from safe, durable and inexpensive materials that will stand up to the severe environment of the construction workplace.

The body of the tool is preferably formed from a durable, high strength plastic material. The sharpened spike is preferably formed from high strength steel so that it resists breakage and may be sharpened.

Figure 1:
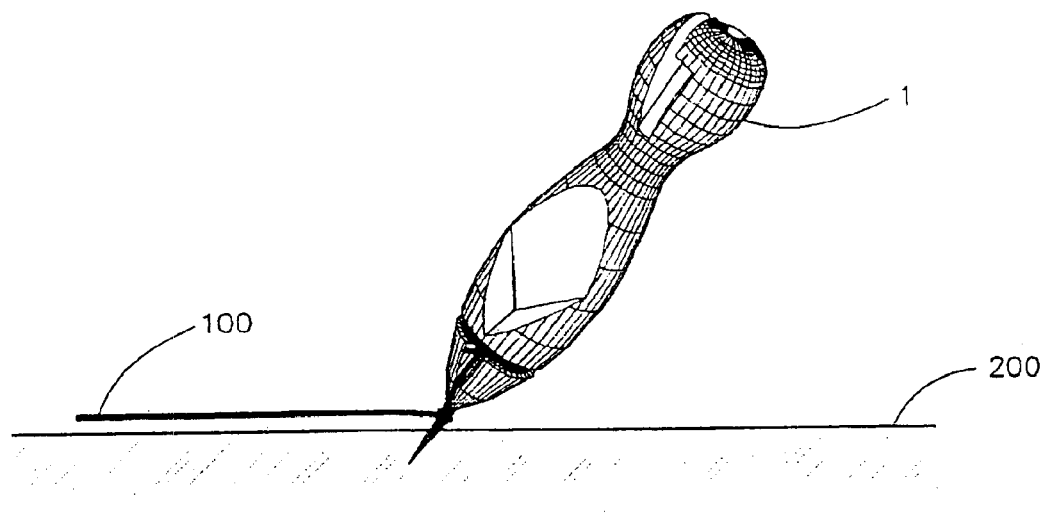
FIG. 1 shows the preferred embodiment of this invention in use as an anchor for a string or chalk line.
Figure 2:
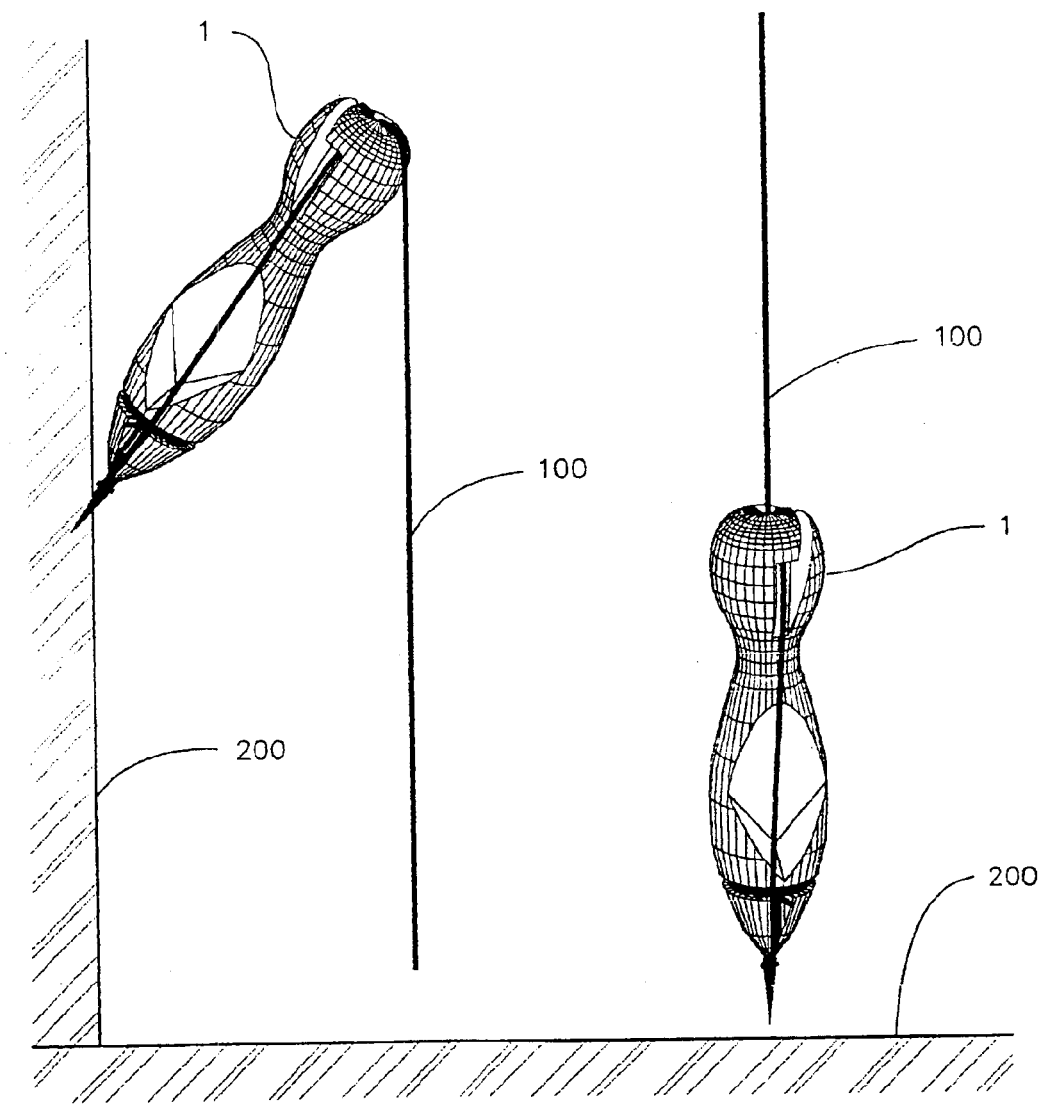
FIG. 2 shows two applications of this invention as a plumb bob.

FIG. 1 shows the preferred embodiment of this invention, a combined string line anchor and plumb bob 1, in use as a string or chalk line anchor. FIG. 1 illustrates a preferred position of the string relative to the spike and the body of the tool. Preferably, the string is wrapped on the spike to be very close to the material into which the spike is being pushed. This helps stabilize the tool in the material, as the string may be pulled without created a significant amount of leverage on a higher-up portion of the tool. FIG. 2 shows two applications of this invention as a plumb bob. These figures also illustrate the benefit of having a conical front end on the tool, as the tool may be pushed into material at an acute angle to the material and the front end of the tool does not interfere with this. With reference to FIGS. 1 through 6, this invention comprises body 10 having a longitudinal axial bore 12, upper portion 14, lower portion 16, and neck portion 18 disposed between the upper and lower portions. This tool also has sharpened spike 30 adjustably and removably disposed within bore 12. Means for clamping 50 the spike to the body within its central bore is also provided.

Figure 3:
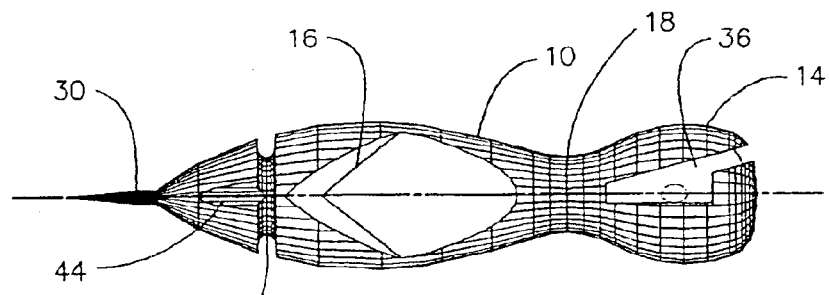
FIG. 3 is a plan view of this invention showing key features of its design.
Figure 4:
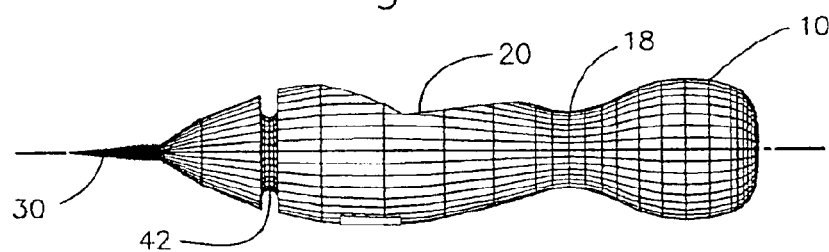
FIG. 4 is an elevation view of this invention showing also showing key design features.
Figure 5:
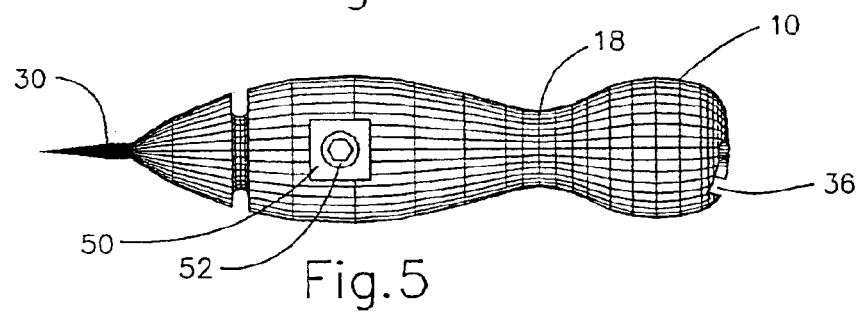
FIG. 5 is a bottom view of this invention showing the location of the means for clamping.
Figure 6:
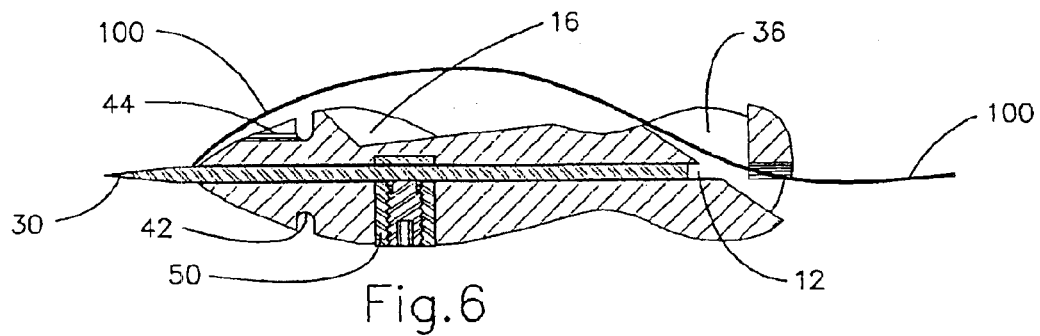
FIG. 6 is a full-length cutaway elevation view of this invention.

Body 10 is formed as a body of revolution having a dart-like shape having a circular cross-section along its axis. With specific reference to FIGS. 3 through 6, the circular cross-section of the body is a maximum within upper and lower portions 14, 16 and a minimum within neck portion 18. Best depicted in FIGS. 3, 4 and 5, body 10 further includes annular line attachment groove 42. FIGS. 3 and 6 show anchor line channel 44. As shown in FIGS. 3, 4 and 5, thumb pocket 20 and means for clamping 50 are disposed between annular groove 42 and neck portion 18. FIG. 6 shows plumb bob string channel 36 which enables this invention to be used as a plumb bob.

Figure 7A:
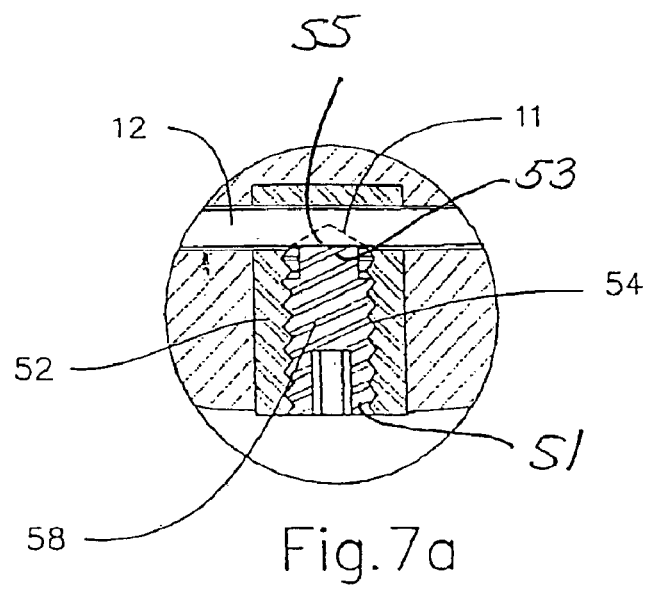
FIG. 7a is a cross-sectional side detail view of one embodiment of a clamping system for a spike in an embodiment of the invention, wherein the preferred clamping member has a generally flat end for abutment against the spike rather than a conventional set screw point shown in dashed lines.
Figure 7B:
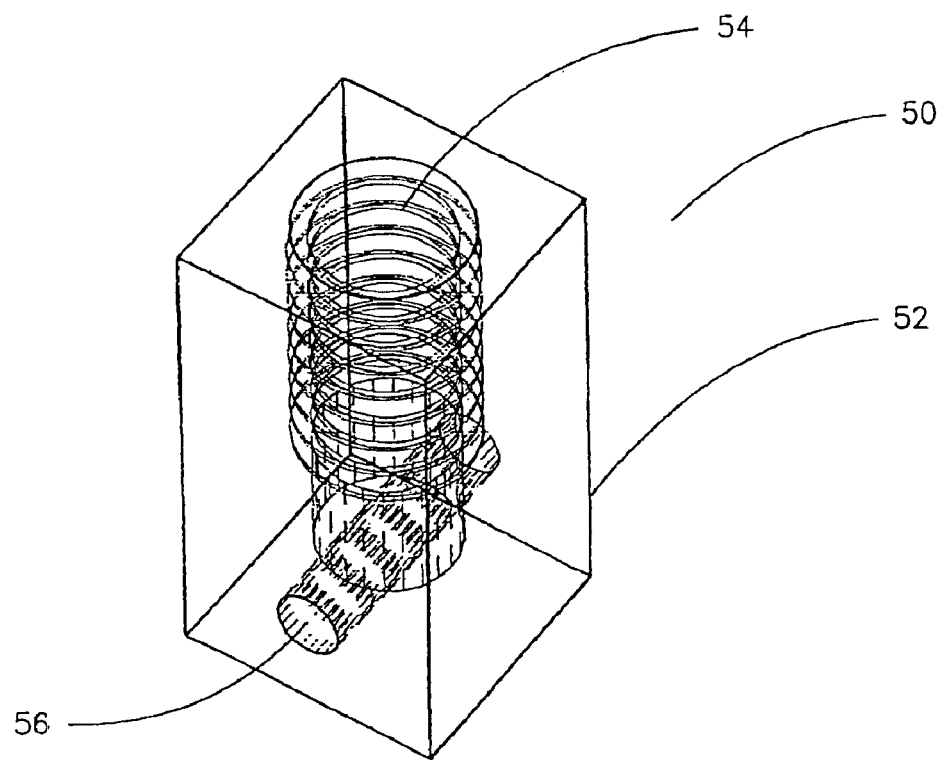

FIGS. 7a and 7b show the details of a system for clamping 50 which includes clamping block 52 having internally threaded through-hole 54 and smooth bore through-hole 56. These through-holes intersect orthogonally. Internally threaded through-hole 54 cooperatively receives externally threaded setscrew 58, and smooth bore through-hole 56 (aligned with axial bore 12) cooperatively receives sharpened spike 30. Preferably, setscrew 58 has a first end 51 which cooperates with an Allen wrench or other tool, for tightening and loosening the setscrew 58. Preferably, setscrew 58 has second, inner end 53 that, upon tightening of the setscrew 58, protrudes into the through-hole 56 to contact the spike 30. Most preferably, inner end 53 has a substantially flat surface 55 that abuts against the pike 30, wherein the flatness of the surface 55 maximizes that contact of the setscrew 58 with the spike without gouging, bending, or poking into the spike. While a setscrew with a point (dashed lines, number 11 in FIG. 7a) or other clamping members may be usable, a flat-surfaced threaded member is preferred because of the force that may be applied to the spike without damaging it and the resulting strong retention of the spike in the chosen position at a chosen length extending out from the tool. The block 52 and setscrew 58 are preferably metal or other hard material, and the through-hole 56 is preferably closely but slidably fit to the diameter of the spike. This way, when the setscrew 58 is tightened against the spike in the block 52, the spike is forced against the hard opposite wall 57 of the through-hole 56 and is not bent. The preferred clamping system provides very secure clamping of the spike, to prevent slippage of the spike in the axial bore 12, while preventing or substantially preventing bending, marring, or scoring of the spike.

The tool should be sized to be convenient to handle, and preferably the end (upper portion 14) has a rounded surface so that it may be handled and impacted by the human hand without injury to the hand. A primary material consideration is that it must be durable and relatively inexpensive. In the preferred embodiment, body 10 is cast from a durable, high strength, synthetic plastic resin, like for example, Nylon™. Sharpened spike 30 is formed from hardened steel, as is clamping block 52 and setscrew 58.

Example sizes of the preferred embodiment of the components of this invention are listed in the following table.

| Component | Figure Call Out | Length (in) | Width (in) | Diameter (in) | Depth (in) |
| --- | --- | --- | --- | --- | --- |
| Body | 10 | 2.5 | NA* | Variable | NA |
| Longitudinal Bore | 12 | 2.5 | NA | .06 | NA |
| Upper portion | 14 | NA | NA | .625 | NA |
| Lower portion | 16 | NA | NA | .625 | NA |
| Neck portion | 18 | NA | NA | .312 | NA |
| Thumb pocket | 20 | .94 | .5 | NA | .2 |
| Annular line attachment groove | 42 | NA | .15 | NA | .31 |
| Anchor line channel | 44 | NA | .15 | NA | .31 |
| Plumb bob string channel | 36 | NA | .15 | NA | .31 |
| Spike | 30 | 2.5 | NA | .057 | NA |
| Clamping Block | 52 | .04 | 025 | NA | .105 |
| Sets crew | 58 | .28 | NA | .156 | NA |

*NA = Not Applicable

It is important that sharpened spike have a sliding fit, clearance of approximately 0.002 inches, within the longitudinal bore and within the clamping block. This sliding fit is preferred so that the spike may be slid in and out of the body of the tool, while minimizing the space in the axial bore and/or clamping block that might allow for bending of the spike. The clamping block is fixed within the body of the tool by securing set screw 58 against spike 30. The clamping block may be removed upon loosening the setscrew.

In use, this tool that integrates the functions of string and chalk line anchors with a plumb bob, is used the same as the conventional individual tools. With reference to FIGS. 1, 3 and 6, string 100 is tied to annular line attachment groove 42. When the tool is used to anchor string or chalk lines, the spike is first adjusted for its proper projection from the lower portion of the body. For softer materials it should project furthest, for harder materials, less. After adjusting the exposure of the spike, line 100 is led from the annular groove to the spike via anchor line channel 44 and wrapped around the spike close to working surface 200. The spike is pressed into working surface 200 to the desired depth and the line is then tensioned and used as any other string or chalk line. Referring now to FIGS. 2, 3 and 6, when the tool is to be used as a plumb bob, line 100 is led from spike 30, around body 10, to plumb bob string channel 36 which exits body 10 at its central axis. The tool is then suspended from line 100 to serve as a plumb bob.

Sheaths for Transport and Storage

A sheath may be provided for various pointed tools, including embodiments of the invented pointed string line anchor and plumb bob. The sheath serves as a cover for the point of the tool, a protector for the tool in general, and a system for connecting/mounting the covered tool on a chalk box or other container or workplace item. In this Description and in the claims, the terms "string line" or "string" includes strings, cables, cords, strips, lines, or other elongated flexible members for attachment to the tool, and used with or without chalk or other materials and substances. In the Description and in the claims, the term "pointed spike" includes the preferred needle-like member, but also may be other sharpened elongated members.

The sheath is generally elongated and comprises an internal cavity with a spike-receiving portion for receiving the distal (forward) end of the tool including the pointed needle or spike, and a body-receiving portion for receiving the central body of the tool. The sheath also includes a lock system that secures the tool in the sheath until the user purposely releases the lock to remove the tool. The lock system may be of various designs, including, for example, a lock system that comprises a frictional fit of the tool between two side walls that curve up and slightly overhang at least portions of the tool in the sheath, so that the tool may be snapped into and out of the sheath past the slightly-overhanging walls. Alternatively, the sheath locking system may include a flexible/moveable locking arm that extends at least part way over the tool in the sheath and engages a portion of the tool. A preferred locking arm extends longitudinally from the forward end of the sheath part way towards the rear of the sheath, and engages or otherwise cooperates with a recess in the tool, such as a thumb recess and/or a string line hook recess.

The sheath preferably includes a base for resting on an object or for attachment to a chalk box or other surface. The sheath preferably includes a slot or other string exit for the string line that allows the string line, extending from its preferred position wrapped around or otherwise attached to the point of the spike, to exit the sheath to extend to a chalk box or a take-up reel. Such a string exit in the sheath helps prevent tangling of the string line.

By inserting and locking the tool in the invented sheath, the point of the tool is much less likely to become dull or broken from abrasion or impact by nails, other tools, or other objects in a tool box, nail box, or vehicle bed, for example. Also, when the sheath covers the point, the tool is unlikely to hurt people, animals, or materials and surfaces. With the tool secured via the sheath to a chalk box, for example, the tool is easily located when needed and is kept close to the equipment with which it is normally used.

A preferred feature of the sheath is that it is sized and shaped in such a way that the tool will not fit or lock into the sheath if the point spike or needle of the tool extends out from the tool beyond a certain length. This way, the sheath may be designed to cooperate only with a tool that has a spike sized or adjusted to what may be considered a relatively safe length.

Referring to FIGS. 8–15, there is shown one, but not the only, embodiment of the invented sheath for a pointed tool, in various positions on one embodiment of a chalk box and by itself unattached to any box. The preferred sheath is adapted to receive, cover, and protect various string line anchors and/or plumb bob tool. One embodiment of such a tool according to U.S. Pat. No. 5,720,113, also by Bartimus, the instant inventor, is shown inserted and being inserted into the sheath. Other tools, such as the combination anchor and plumb bob tool described above or other tools with pointed tips, may also be used with various embodiments of the invented sheath, wherein some adaptation may be made to the sheath or to the tool so that the sizes and lengths of the cavities in the sheath are appropriate and so that the locking system of the sheath properly overhangs a portion, or alternatively catches properly on a recess or protrusion, of the tool.

Figure 8:
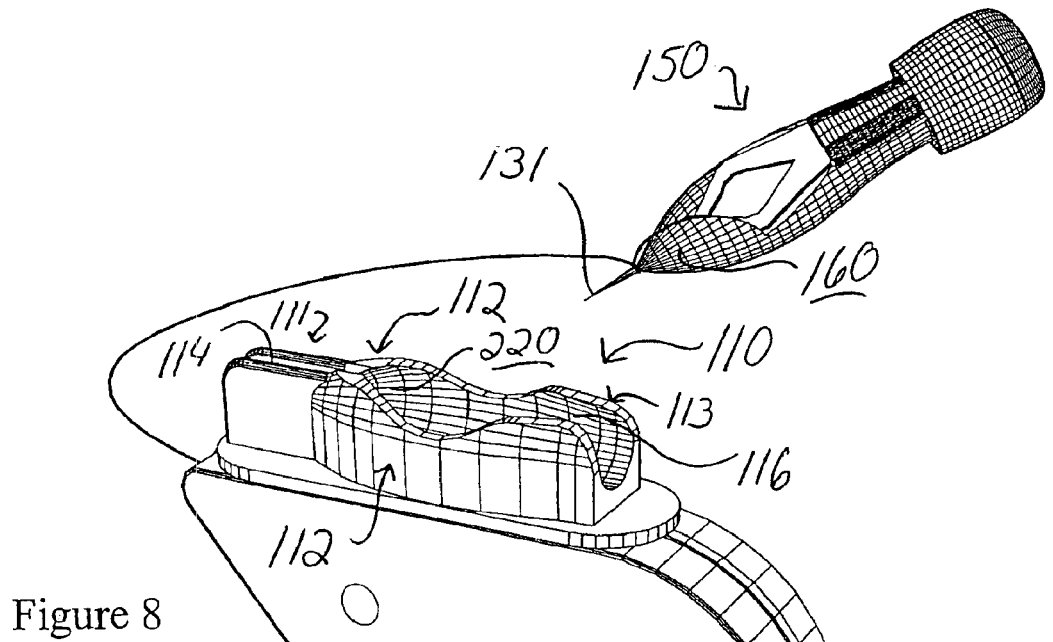
FIG. 8 illustrates one embodiment of an invented sheath attached to a chalk box and in use with one embodiments of the invented tool.

In FIG. 8, there is shown the preferred sheath 110, in an empty state and attached to a chalk box 170. The sheath 110 comprises a cavity wall 112 with a front portion 111 and a rear portion 113, wherein the cavity wall 112 surrounds and defines an interior cavity. The interior cavity comprises a forward cavity portion 114 at the sheath front end (distal end), a rearward cavity portion 116 generally central between the front end and the sheath rear end (proximal end), and an opening into the interior cavity at the rearward cavity portion. Forward and rearward cavity portions 114, 116 preferably lie in series coaxially on the sheath longitudinal centerline or "longitudinal axis." The forward cavity portion 114 is adapted to receive the pointed end of the tool 150, particularly, the portion of the pointed spike 131 protruding from the tool body. The rearward cavity portion 116 is adapted to receive the forward end of the tool body so that the generally conical surface 160 of the tool abuts against the front, inside surface of the rearward cavity, herein also called the limiting surface 220. This surface 220 serves as a stop to limit forward movement of the tool, so that the tool may only be inserted to a certain extent, no matter how small a distance the pointed spike 131 extends from the body. The limiting surface 220 results in a certain location for the tool body along the longitudinal axis of the sheath, which certain location may assist in locating the tool in the proper location for various locking systems as further discussed below. In embodiments in which the spike 3 is adjustable in and out from the body, this limiting surface feature is beneficial as it prevents a tool from being placed in the sheath with the spike extended far outward from the body. While the preferred limiting surface 220 and cooperating tool surface 160 are described as generally conical, they may also be called "conoidal" or "bullet-shaped" as their conical walls are curved as in a conventional bullet shape. Alternatively, other cooperating/mating shapes may be used, which preferably do not allow "wiggle" or "rattling" of the tool in the sheath.

Figure 9:
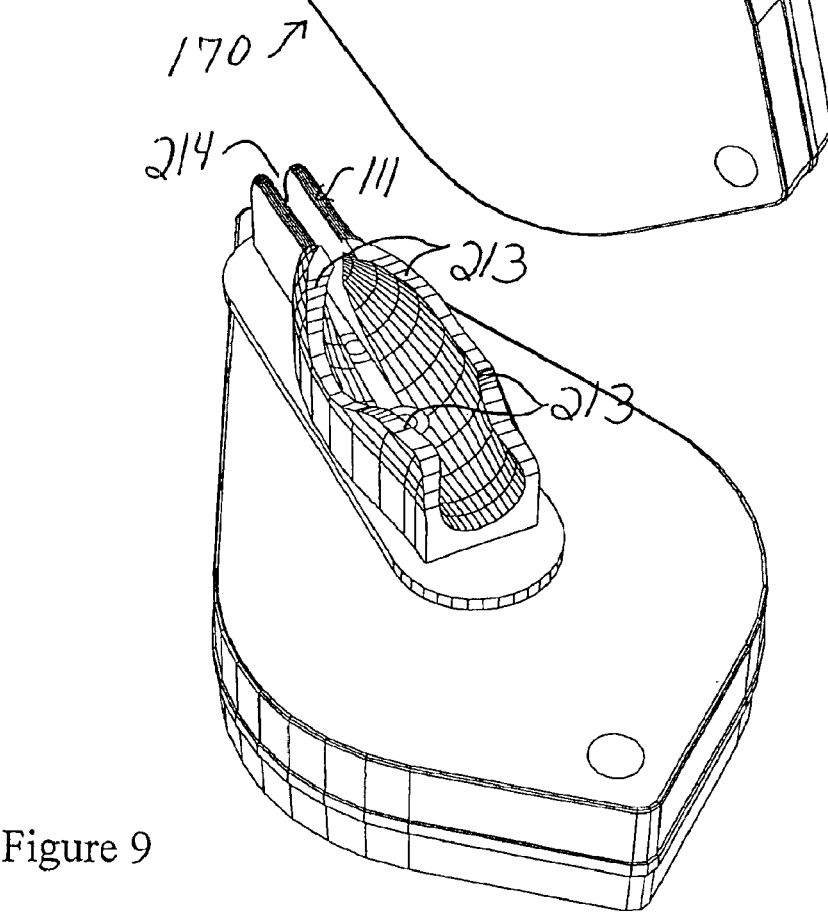
FIG. 9 illustrates the sheath and chalk box of FIG. 8.
Figure 16:
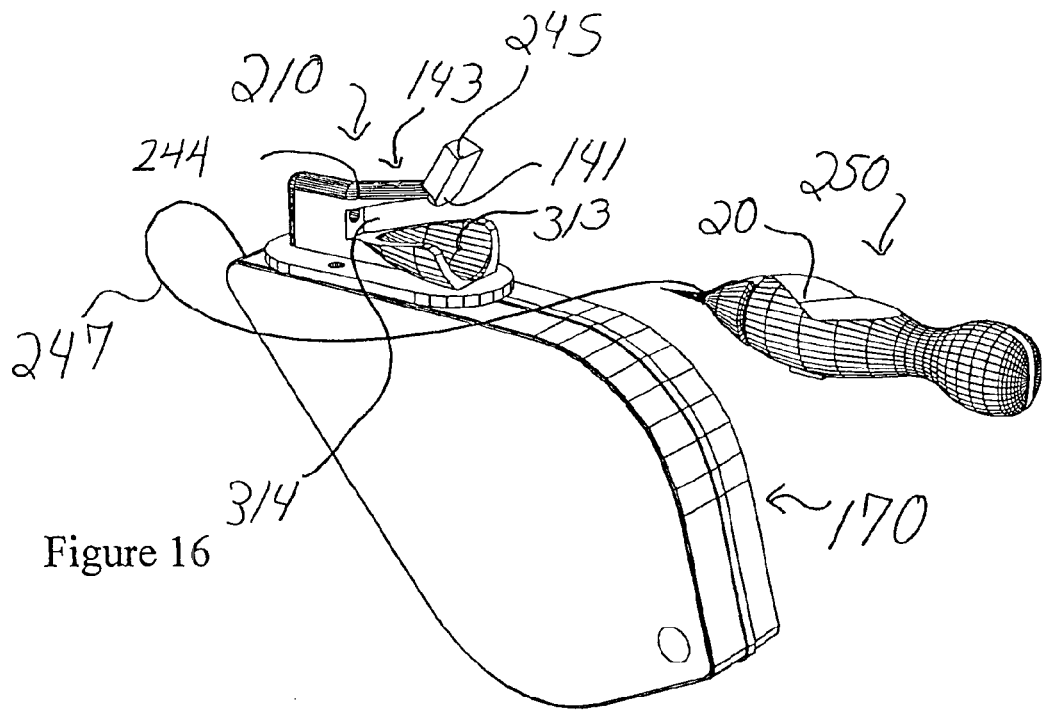
FIG. 16 is a perspective view of an alternative embodiment of sheath attached to the side of a chalk box and in use with another embodiment of the invented tool.
Figure 17:
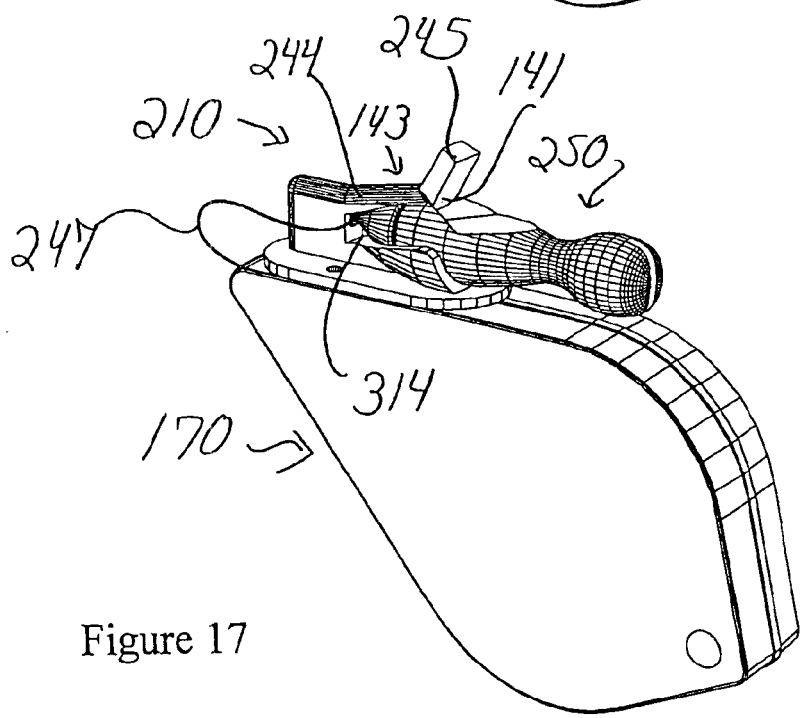
FIG. 17 is a perspective view of the embodiments of FIG. 16, with the tool fully inserted in the sheath and with the string line extending through the string exit and extending into the corner of the box.
Figure 18:
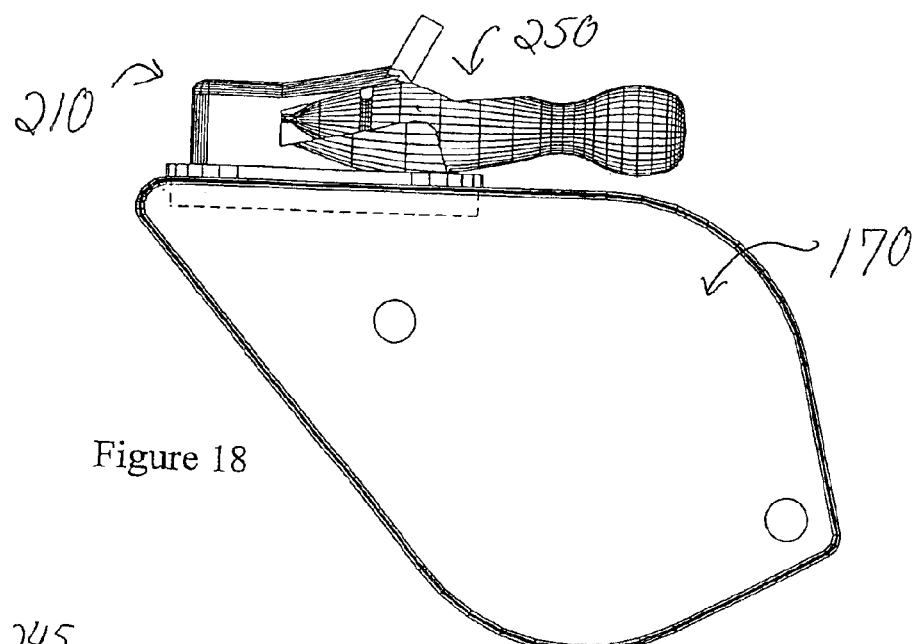
FIG. 18 is a side view of the embodiment of FIGS. 16 and 17, showing the attachment flange in dashed lines extending between and captured by wall portions of the chalk box.
Figure 19:
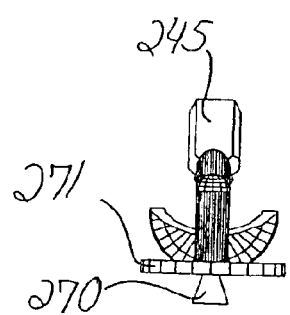
FIG. 19 is a front end view of the sheath of FIGS. 16–18.

The preferred forward cavity portion 114 may include an open front end 214 as shown to best advantage in FIGS. 9, 12, and 14. The walls of the front portion 111 rise generally vertically from the base of the sheath, and do not need to extend over the spike. Rather, these walls are close enough and tall enough that they shield the user from the point and shield the point from damage, but do not necessarily entirely surround or cover the point or the spike. Alternatively, the front end and/or the top of the front cavity portion may be closed (as shown in the embodiments of FIGS. 16–23), in which case the point of the spike will certainly not be exposed.

The preferred walls of the rear portion 113 extend generally vertically upward (when viewed in FIGS. 10, 11, 13, and 15) and their top edge portions 213 curve circumferentially over the a rearward cavity portion 116, so as to generally conform to the shape of the outer surface of the tool body in that area when the tool is in the sheath. The top edge portions 213 each extend in this manner generally in an arc of about 25–45 degrees (preferably in the range of 20–55 degrees) up from horizontal midline of the rearward cavity. This way, the top edge portions extend or "overhang" over the cavity and the inserted tool to an extent that allows the tool to snap past those overhanging edges when being inserted, but also to an extent that, due to the resilience of the sheath walls, retains the tool in the sheath until a user purposely pulls the tool out again. As may be seen to best advantage in FIGS. 12 and 13, the top edge portions 213 of the walls do not overhang the tool to the same extent, and, in general, the walls extend the farthest near the rear end of the tool. The tool may be inserted generally front end down into the front cavity portion, so that the front end of the tool does not need to snap down past the front overhanging edge portions (front left and right portions 213). Once the tool is in this position (as shown 10, the rear end of the tool may be pushed down to snap past the rear overhanging edge portions (rear left and right portions 213). The inner surfaces 213' of the rear left and right portions 213) may be filed or cut more than shown in the figures, to remove some of the material interfering with a smooth snap of the tool into the cavity.

Yet another alternative embodiment of a sheath 210 is shown in FIGS. 16–23. This sheath includes an arm-style locking system that extends over the rearward cavity and the tool in its position in the sheath. This sheath is shown cooperating with an invented tool 250, according to embodiments of U.S. Pat. No. 6,622,393 from which this application claims priority and which is incorporated herein by reference.

The locking system arm preferably automatically engages or sets in or on a latching surface of the tool, which may be a recessed surface or a protruding surface of the tool for example, located ⅓–⅔ of the way from the front end of the tool body to the rear end of the tool body. When the tool 250 is inserted into the sheath 210, the locking system engages and is released only manually when the user wishes to remove the tool. Preferably, the locking system arm 143 comprises a latch 141 that catches in or on a latching surface of the tool (which may be a recess 20 in the tool body or a protruding ridge of surface (not shown)) when the tool slides into place against the limiting surface of the front sheath portion and the curved walls 313. The latch is preferably biased into the closed position, that is, biased inward toward the center of the cavity, and, hence, toward the tool surface. The latch preferably "snaps" into the tool recess when the tool is properly in place in the sheath. This way, the tool- is easily and conveniently sheathed, and yet is not easily or accidentally unlocked or dropped out of the sheath. The recess 20 into which the latch 141 snaps is preferably the thumb pocket of the tool, but may be other recesses or even protrusions on which the locking arm could catch. For example, the sheath may be adapted to use with the tools described in U.S. Pat. No. 5,720,113, and the arm may catch in the recess in which the L-shaped hook resides. The forward wall of the recess (or alternatively a protrusion or ridge area, not shown, in a similar area of the tool) is the wall or structure against which the latch abuts and catches, thus preventing rearward movement of the tool out of the sheath.

Inserting and locking the tool in the sheath of FIGS. 16–23 may be done as easily as pushing the tool forward into the sheath, generally along or slightly above the longitudinal axis of the sheath. The locking arm may move upwards in response to the pressure of the tool sliding into the cavity of the sheath, so that the user does not necessarily need to lift the handle for insertion of the tool. As the tool slides further into the cavity, the latch 141 slides along the tool surface and then snaps/falls down into the recess to lock the tool in the sheath. In this manner, a recess is preferred to an upwardly extending ridge/protrusion, which might require that the handle be lifted to insert the tool.

Figure 20:
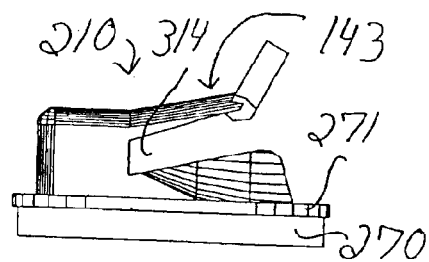
FIG. 20 is a side view of only the sheath of FIGS. 16–19.
Figure 21:
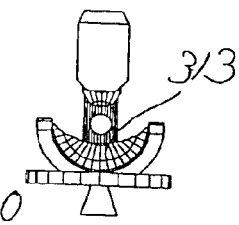
FIG. 21 is a rear end view of the sheath of FIGS. 16–20.
Figure 22:
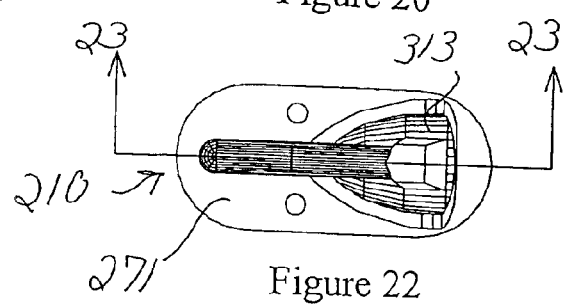
FIG. 22 is a top view of the sheath of FIGS. 16–21.
Figure 23:
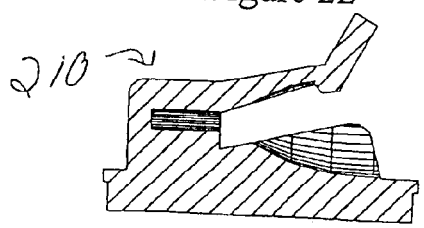
FIG. 23 is a cross-sectional view of the sheath of FIGS. 16–22, viewed along the line 23—23 in FIG. 22.

When the user wishes to remove the tool from the sheath, he/she may actuate an unlatching means, such as a manual handle that lifts the latch 141 out of the recess (or alternatively, lifts the latch off/over the protrusion or ridge). The preferred lock mechanism comprises an arm 143 that integrally connects to the top of the cavity wall at a connection region 244 (also called "hinge region"). The arm extends generally parallel to the longitudinal axis of the sheath and rearward toward and over the cavity. The handle 245 extends over the cavity. Pressure on the handle 245 causes the connection region to flex slightly, so that the lock arm pivots generally at the connection region to raise the latch up out of the recess. Thus, the connection region may be considered a hinge, hinge region, or pivotal connection, as the connection region acts to allow the lock member to pivot relative to the rearward cavity wall portion. Tool 250 can then be pulled longitudinally rearward outward of the sheath. When the pressure on the handle is released, the resiliency of the connection region and the arm returns the lock member to its starting position, with the latch biased toward the centerline of the sheath to be slightly closer to the centerline than is the inner surface of the rearward cavity portion at the rearward edge of the cavity wall, as best shown in FIGS. 20 and 23.

While various ways of attaching the lock member to the cavity wall may be used, and various ways of forming the biasing means and the pivoting fulcrum may be used, the preferred ways for forming a locking arm comprise integral molding of the plastic lock member as part of the plastic sheath. This way, the natural resilience of the plastic of the sheath wall, and the lock member connection region may be used to create the biasing that latches the tool in place. Preferably, the sheath is made by molding plastic, preferably a plastic or plastics that are durable and that allow the hinge area to be sufficiently flexible and resilient to properly operate the lock system. The plastic may be chosen and the thickness and shape of the lock bar attachment area and the adjacent cavity wall areas are chosen so that the flexing moves the latch upwards a sufficient distance to unlatch the tool. The biasing of the latch system into the closed, locked position against the tool wall may comprise the resilience of the plastic that moves the lock bar back into its original position when the handle is no longer being pressed.

A slot or other sheath exit is preferably provided for passage of the string line from the interior cavity to outside the sheath. As shown in FIG. 8, the string line 247 is normally wrapped around or otherwise connected to the spike when the tool is inserted into the sheath. The string line, therefore, extends rearward from the spike and out of the internal cavity through the front opening 214 of the front cavity portion (FIGS. 8 and 9), or through side slot 314 in FIGS. 18 and 20). Preferably, the exit allows the string line to exit the interior cavity without lying between the tool body and the surfaces of the sheath internal cavities. This way, the string line is not trapped or pinched between the conical surface and the limiting surface. The exit is sized so that the string line is not pinched or pressured to an extent that would, even after repeated sheathings, damage or weaken the string. After passing through the string exit, the string line preferably extends into a chalk box 70 or is taken-up by other means, such as being wound on a spool or other object. By positively locating the string line location of exit from the sheath and by containing/taking-up the length of the string line in a chalk box or other container or holder, tangling and knotting of the string line are minimized.

As illustrated in FIGS. 8, 9, and 16-18, the sheath preferably is adapted for attachment to a chalk box 70 or other object, to further aid in preventing tangling of the string line and/or damage to the sheath and tool that might otherwise occur if the sheath and tool are stored or transported loose in a tool box or vehicle. Adaptation comprises a base positioned underneath the cavity wall that has a generally planar platform surface upon which the sheath may rest. The base may include means for attachment to the chalk box or other object, preferably, one of more apertures for receiving a screw or bolt that may extend, for example, into an attachment hole in the chalk box. The sheath 10 may then be fastened by means of a screw(s) (not shown) through the aperture(s) to a carpenter's chalk box 70, either on a top surface or on a side surface, as shown in FIGS. 8 and 9. The string line extends from the sheath open front end to the string line hole (not shown) in the chalk box 70 and preferably all of the length of the string line is contained within the chalk box until use of the tool and the string line. This way, the chance of tangles and damage to the string line and to the tool is minimized, and the tool is unlikely to be lost or to do damage to people or materials.

Alternatively, as shown by the embodiment in FIGS. 16–23, the sheath may be molded or otherwise formed to include an attachment flange 270 or other protrusion, which may be captured by a portion of the box 70. For example, the flange 270 of the sheath of FIGS. 16–23 extends down generally parallel to the base of the sheath and is captured between two halves of the box. The wedge shape of the flange urges a tight connection of the sheath to the box, as the flange will tend to be driven down further into the box, and held firmly by the pressure of the walls of the box capturing the flange. The flange 270 may be a rubbery, soft or otherwise compressible material, to help prevent the parts of the box from being wedged open to a significant extent when the flange is between them. Also alternative, a sheath according to the invention may be molded as an integral part of a chalk box 70 or tool box, for example.

Preferably, the base is sized to provide a stable platform for the sheath. The base preferably extends forward beyond the front portion 111 of the cavity wall to be the front-most extremity of the sheath. The base 271 preferably extends rearward beyond the rear edge of the rear portion of the cavity wall to be the rearmost extremity of the sheath. Also, the base preferably extends transversely to the longitudinal axis to extend at least underneath, or out past, both sides of the sheath cavity wall.

With the tool housed in the sheath attached to the chalk box 70, the tool may be easily withdrawn from the sheath, by snapping the tool up and out of the sheath (FIGS. 8–15) or by lifting the handle and pulling out the tool (FIGS. 16–23). Because the sheath is secured to the chalk box, the tool may be easily removed without the sheath tipping over or moving during the operation. The tool may then be moved away from the chalk box 70 to pull the string line out of the chalk box, coated with chalk, for use. Use of the tool, either as an anchoring device for chalk line marking or as a plumb bob, may be done according to the techniques described in U.S. Pat. Nos. 5,720,113 and 6,622,393 (incorporated herein), or other techniques as may be preferred by particular craftsmen.

The inventor envisions that other tools, and especially other combined anchor and plumb bob tools, may be used in the invented sheath. Some modification to the sheath may be necessary, for example, to lengthen or adapt the locking mechanism. Or, some modification to the tool may be necessary, for example, to supply a recess, protrusion, or other structure for cooperating with a locking system to retain the tool in the sheath.

The sheaths may be made of various materials. For example, the sheath of FIGS. 8–15 may be made of a fairly rigid material, while the sheath of FIGS. 16–23 may be more rubbery and pliant. The material and size and shape of the sheaths may vary according to the particular attributes of the tool being inserted.

Although this invention has been described above with reference to particular means, materials and embodiments, it is to be understood that the invention is not limited to these disclosed particulars, but extends instead to all equivalents within the scope of the following claims.

I claim:

1. A sheath and string-line tool combination for use with a string, the combination comprising:
   a tool having a tool body with a front end and a rear end, a pointed member protruding from the front end, and a latching surface on a side of the tool;
   a sheath having a sheath front end and a sheath rear end, a longitudinal axis between said sheath front end and said sheath rear end, a cavity wall defining an interior cavity with an opening receiving the tool, wherein the interior cavity has a forward portion receiving the pointed member and a rearward portion receiving at least a part of the body of the tool;
   a locking system releasably locking the tool in the sheath, the locking system comprising a latch that is biased to extend longitudinally rearward over the interior cavity and adapted to cooperate with the tool body latching surface to prevent removal of the tool from the sheath.

2. The combination of claim 1, wherein said rearward portion of the interior cavity has a limiting surface near said forward portion of the interior cavity, and, when the tool is received in the sheath, the tool body abuts against said limiting surface to limit forward movement of the tool in the interior cavity, and the pointed member extends into the forward portion of the interior cavity, and wherein the latching surface is at a location on the tool from 1/3–2/3 of the way from the front end of the tool body to the rear of the body.

3. The combination of claim 1, wherein the sheath further comprises a base with a planar outer surface adapted for attachment to a chalk box.

4. The combination of claim 1, wherein the sheath cavity wall has a slot through which said string passes from the forward portion of the interior cavity to outside the sheath.

5. The combination of claim 1, comprising a string exit through the sheath cavity wall, wherein the string exit is an open front of the cavity wall.

6. The combination of claim 1, wherein the pointed member is a sharpened spike, and the tool further comprises a clamping unit with a through-hole receiving the spike a setscrew extending into the clamping unit and having a flat end contacting the spike, wherein the setscrew is in threaded connection with the clamping unit and adapted to be screwed into the clamping unit to tighten the flat surface against the spike.

7. The combination of claim 1, wherein said tool body has a rear end, and a tool longitudinal axis between the front end and the rear end, a side surface generally parallel to the tool longitudinal axis, and said latching surface is in said side surface, and wherein the forward portion and rearward portions of the interior cavity and the opening are aligned generally coaxially on the sheath longitudinal axis, and the locking system comprises a lock member connected to the cavity wall extending generally parallel to the sheath longitudinal axis and pivotal in a plane passing through said sheath longitudinal axis, wherein a rearward end of the lock member is said latch and the lock member is biased to pivot the latch toward the sheath longitudinal axis rearward of said opening.

8. The combination of claim 7, wherein the lock member integrally extends from the cavity wall, and the lock member pivots in said plane passing through said sheath longitudinal axis by means of a portion of the cavity wall to which the lock member is connected flexing in direction parallel to said plane.

9. A tool, sheath and chalk box combination comprising:
   a string-line anchor tool having a tool body, a pointed member and a string;
   a sheath having a sheath front end and a sheath rear end, a longitudinal axis between said sheath front end and said sheath rear end, a cavity wall surrounding and defining an interior cavity with an opening receiving the anchor tool, wherein the interior cavity has a forward portion receiving the pointed member and a rearward portion receiving at least a part of the tool body; and
   a chalk box containing chalk for coating the string of the anchor tool;
   wherein the sheath is attached to the chalk box;
   wherein said rearward portion of the interior cavity has a limiting surface near said forward portion of the interior cavity, and wherein said limiting surface is adapted to limit forward movement of the anchor tool in the interior cavity.

10. A tool, sheath and chalk box combination comprising:
    a string-line anchor tool having a tool body, a pointed member and a string;
    a sheath having a sheath front end and a sheath rear end, a longitudinal axis between said sheath front end and said sheath rear end, a cavity wall surrounding and defining an interior cavity with an opening receiving the anchor tool, wherein the interior cavity has a forward portion receiving the pointed member and a rearward portion receiving at least a part of the tool body; and
    a chalk box containing chalk for coating the string of the anchor tool;
    wherein the sheath is attached to the chalk box;
    wherein the sheath cavity wall has a slot through which said string passes from the forward portion of the interior cavity to outside the sheath and into the chalk box to be in contact with the chalk.

11. A tool sheath and chalk box combination comprising:
    a sheath for a string-line anchor tool having a tool body, a pointed member and a string, the sheath having a sheath front end and a sheath rear end, a longitudinal axis between said sheath front end and said sheath rear end, a cavity wall surrounding and defining an interior cavity with an opening adapted to receive the anchor tool, wherein the interior cavity has a forward portion adapted to receive the pointed member and a rearward portion adapted to receive at least a part of the tool body;
    a locking system adapted to releasably lock the anchor tool in the sheath; and
    a chalk box containing chalk for coating the string of the anchor tool;
    wherein the sheath is attached to the chalk box;
    wherein said rearward portion of the interior cavity has a limiting surface near said forward portion of the interior cavity, and wherein said limiting surface is adapted to limit forward movement of the anchor tool in the interior cavity.

12. The combination of claim 11, wherein the sheath comprises a base with a planar outer surface attached to the chalk box.

13. A tool sheath and chalk box combination comprising:
a sheath for a string-line anchor tool having a tool body, a pointed member and a string, the sheath having a sheath front end and a sheath rear end, a longitudinal axis between said sheath front end and said sheath rear end, a cavity wall surrounding and defining an interior cavity with an opening adapted to receive the anchor tool, wherein the interior cavity has a forward portion adapted to receive the pointed member and a rearward portion adapted to receive at least a part of the tool body;
a locking system adapted to releasably lock the anchor tool in the sheath; and
a chalk box containing chalk for coating the string of the anchor tool;
wherein the sheath is attached to the chalk box;
wherein the sheath cavity wall has a slot through which said string passes from the forward portion of the interior cavity to outside the sheath and into the chalk box to be in contact with the chalk.

14. A tool sheath and chalk box combination comprising:
a sheath for a string-line anchor tool having a tool body, a pointed member and a string, the sheath having a sheath front end and a sheath rear end, a longitudinal axis between said sheath front end and said sheath rear end, a cavity wall surrounding and defining an interior cavity with an opening adapted to receive the anchor tool, wherein the interior cavity has a forward portion adapted to receive the pointed member and a rearward portion adapted to receive at least a part of the tool body;
a locking system adapted to releasably lock the anchor tool in the sheath; and
a chalk box containing chalk for coating the string of the anchor tool;
wherein the sheath is attached to the chalk box;
wherein the forward portion and rearward portions of the interior cavity and the opening are aligned generally coaxially on the sheath longitudinal axis, and the locking system comprises a lock member connected to the cavity wall extending generally parallel to the sheath longitudinal axis and pivotal in a plane passing through said sheath longitudinal axis, wherein the lock member has a rearward latch end and the lock member is biased to pivot the latch end toward the sheath longitudinal axis rearward of said opening.

15. The combination of claim 14, wherein the lock member integrally extends from the cavity wall, and the lock member pivots in said plane passing through said sheath longitudinal axis by means of a portion of the cavity wall to which the lock member is connected flexing in direction parallel to said plane.

16. A sheath system for a combination string-line anchor and plumb bob tool, the tool having a tool body and a pointed spike extending forward from the tool body and a string extending from the tool, the sheath system comprising:
a sheath having a sheath front end and a sheath rear end, a longitudinal axis between said sheath front end and said sheath rear end, a cavity wall surrounding and defining an interior cavity with an opening adapted to receive the tool, wherein the interior cavity has a forward portion adapted to receive the pointed spike and a rearward portion adapted to receive at least a part of the body of the tool;
a locking system adapted to releasably lock the tool in the sheath, the locking system comprising a lock member connected to the cavity wall and that is pivotal in a plane parallel to the longitudinal axis of the sheath, the lock member having a rearward latch end and a handle at or near the rearward latch end, wherein the lock member is biased to place the rearward latch end generally across a portion of the opening for extending into a recess of the tool body rearward of the opening to prevent removal of the tool from the sheath, and wherein the handle is adapted, when pressed away from the cavity wall, to pivot the lock member so that the rearward latch end rises away from the opening.

17. A sheath system as in claim 16, further comprising a chalk box containing chalk, wherein the sheath is attached to the chalk box.

* * * * *